UNITED STATES PATENT OFFICE.

RUDOLF REYHER, OF FRANKFORT-ON-THE-MAIN, GERMANY, ASSIGNOR TO THE FARBENFABRIKEN, VORMALS FR. BAYER & CO., OF ELBERFELD, GERMANY.

AZIN DYE AND PROCESS OF MAKING IT.

SPECIFICATION forming part of Letters Patent No. 559,063, dated April 28, 1896.

Application filed October 14, 1895. Serial No. 565,663. (Specimens.) Patented in Germany May 11, 1894, No. 81,963; in England May 16, 1894, No. 9,610; in France August 9, 1894, No. 240,621, and in Italy September 4, 1894, XXIX, 37,005, and LXXII, 387.

*To all whom it may concern:*

Be it known that I, RUDOLF REYHER, chemist and doctor of philosophy, (assignor to the FARBENFABRIKEN, VORMALS FR. BAYER & Co., of Elberfeld, Prussia, Germany,) residing at Frankfort-on-the-Main, Prussia, Germany, a subject of the Emperor of Russia, have invented a new and useful Improvement in the Manufacture of Azin Dye, (for which the FARBENFABRIKEN, VORMALS FR. BAYER & CO., have already obtained Letters Patent in Germany, No. 81,963, dated May 11, 1894; in England, No. 9,610, dated May 16, 1894; in France, No. 240,621, dated August 9, 1894, and in Italy, XXIX, 37,005, LXXII, 387, dated September 4, 1894;) and I declare the following to be an exact and clear description of my invention.

My invention relates to the production of azin dye obtainable from condensing nitrosodimethylanilin hydrochlorid (or nitrosodiethylanilin hydrochlorid) with paratolylmetatoluylenediamin, valuable violet-red azin dyes being produced in this manner, which are distinguished by their brilliancy and fastness on washing and exposure to light.

The aforesaid paratolylmetatoluylenediamin can be obtained according to the following method: A mixture of one part, by weight, of metatoluylenediamin hydrochlorid (or the corresponding quantity of another salt of metatoluylenediamin) with four parts, by weight, of paratoluidin is heated during about twenty hours at from 250° to 270° centigrade in a vessel capable of withstanding pressure. An excess of soda-lye having been added the unaltered paratoluidin is then distilled over by means of steam. The remaining oil is separated while hot from the alkaline solution and is boiled with water in order to remove unaltered metatoluylenediamin, if any be present. The oil thus obtained is mixed with a slight excess of muriatic acid and a large quantity of water and the mixture is boiled until it is apparent that no more of the oily mass will dissolve. The residue having been separated by filtration a filtrate is obtained containing merely the hydrochlorid of paratolylmetatoluylenediamin, which, owing to its slight solubility in cold water, separates in the form of brilliant scales or flat needles as the liquid cools. In order to obtain the base, the hot solution in water of the said paratolylmetatoluylenediamin hydrochlorid is mixed with a small quantity of muriatic acid digested with animal charcoal, and after filtration the filtrate is mixed with ammonia liquor. The paratolylmetatoluylenediamin is separated as a light oil, which crystallizes after a time.

According to our researches the above paratolylmetatoluylenediamin may be easily condensed with nitroso derivatives of secondary or tertiary aromatic amins, or generally with all "substances" whose behavior is known to be analogous to that of the nitroso compounds.

In carrying out my invention practically I can, for example, proceed as follows: 21.2 parts, by weight, of paratolylmetatoluylenediamin are dissolved in ninety parts, by weight, of alcohol and twenty-eight parts, by weight, of nitrosodimethylanilin hydrochlorid are gradually added to the cold solution. The reaction mixture, which becomes warm spontaneously, is stirred until the nitroso compound is no longer distinguishable and the solution has assumed a deep-blue color. The liquid is then heated in a vessel provided with a reflux-condenser until it acquires a pure bright-red color. As the mixture cools the dye separates in crystals for the most part, which are isolated by filtration, washing with alcohol, and drying. Another method for isolating the dye consists in distilling off the alcohol, mixing the residue with hot water, and mixing, then, the liquid with a solution of common salt. On cooling, the dyestuff separates in small scales, which are filtered off, pressed, and dried. The dyestuff forms, when pulverized, a greenish-black powder with metallic luster, readily soluble in water with a violet-red color, in alcohol with a bluish-red color. By concentrated sulfuric acid (66° Baumé) it is dissolved with a green color, which turns into blue on the addition of a small quantity of ice-water to the sulfuric-acid solution. If a very large quantity of water is added to the aforesaid sulfuric-acid solution, the green solution turns into violet-red.

If the solution of the dyestuff in water is mixed with soda-lye, red flakes separate from the watery solution. The dyestuff produces on cotton mordanted with tannin brilliant violet-red shades of great fastness to the action of alkali and light. The coloring-matter thus produced has probably the following formula:

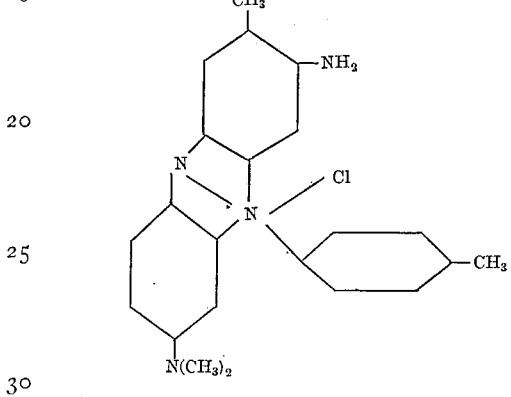

An analogous dyestuff is obtained if in the foregoing example the nitrosodimethylanilin is replaced by nitrosodiethylanilin. The dyes thus obtained yield in general shades somewhat more bluish-red than those produced by the dye defined in the example.

Having now described my invention and in what manner the same is to be performed, what I claim as new, and desire to secure by Letters Patent, is—

1. The process for the production of azin dyes, which process consists in condensing salts of nitrosodialkylanilin with paratolylmetatoluylenediamin and then separating the dye by filtration.

2. As new articles of manufacture the azin dyes obtainable from condensing salts of nitrosodimethylanilin with paratolylmetatoluylenediamin having in case nitrosodimethylanilin is used probably the following formula:

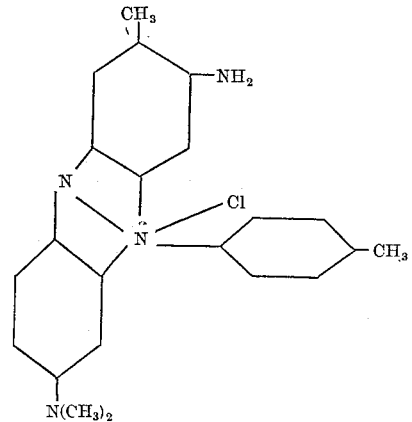

forming a greenish-black powder with metallic luster, easily soluble in water with a violet-red color, in alcohol with a bluish-red color, insoluble in soda-lye, soluble in concentrated sulfuric acid (66° Baumé) with a green color, which turns first into blue on the addition of a small quantity of ice-water to the sulfuric-acid solution and finally into violet-red on the addition of a very large quantity of water producing on cotton mordanted with tannin brilliant violet-red shades of great fastness to the action of alkali and light.

In testimony whereof I have signed my name in the presence of two subscribing witnesses.

RUDOLF REYHER.

Witnesses:
ALVESTO S. HOGUE,
JEAN GRUND.